Figure 1:
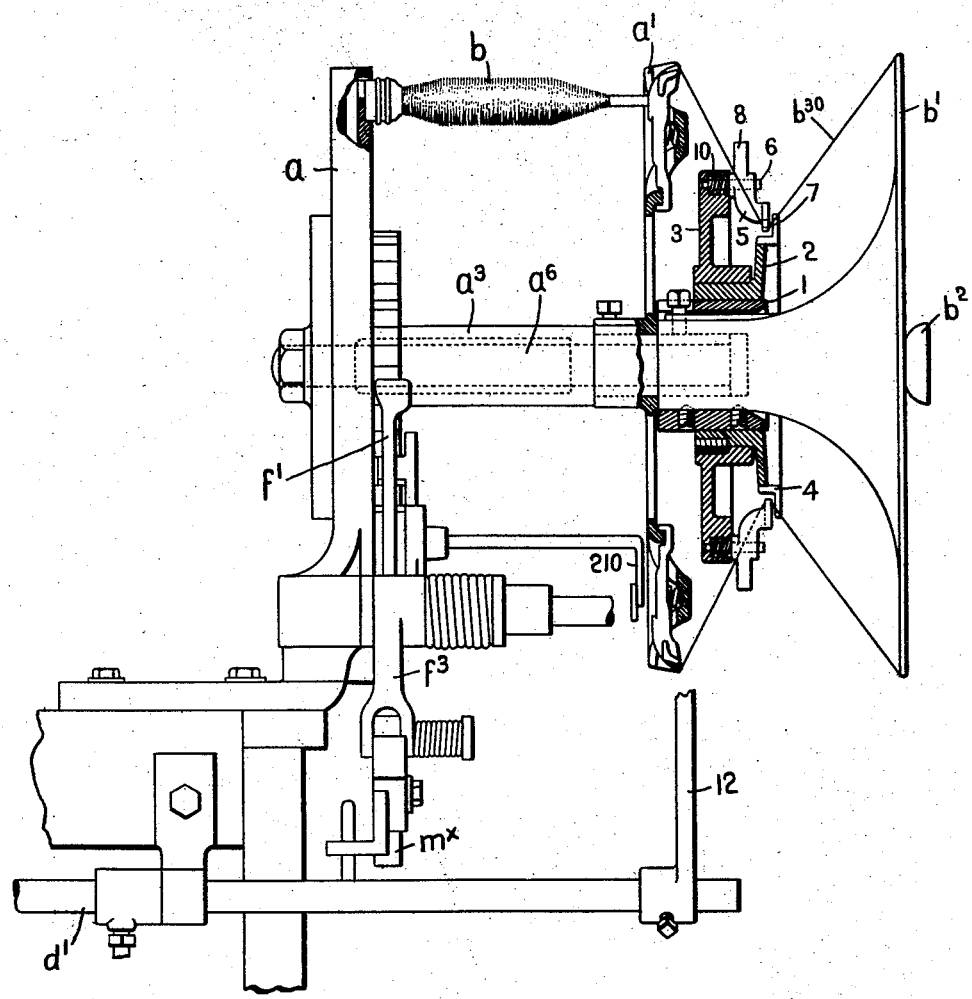

A. E. RHOADES.
FILLING END SLACK CONTROLLING MECHANISM FOR LOOMS.
APPLICATION FILED AUG. 4, 1913.
1,115,572.
Patented Nov. 3, 1914.
2 SHEETS—SHEET 2.
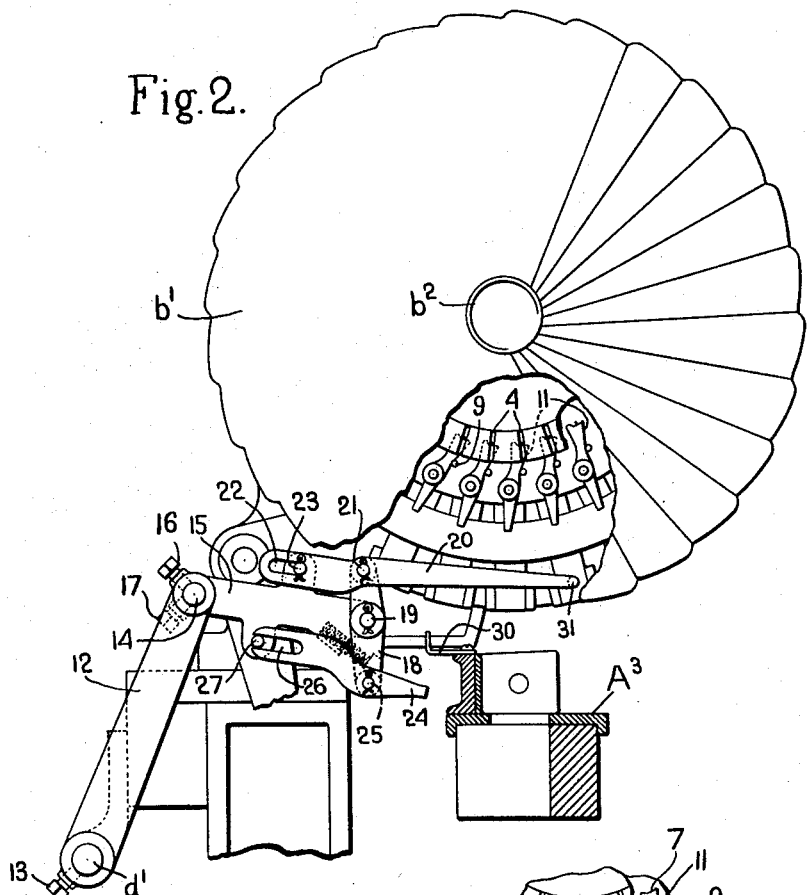
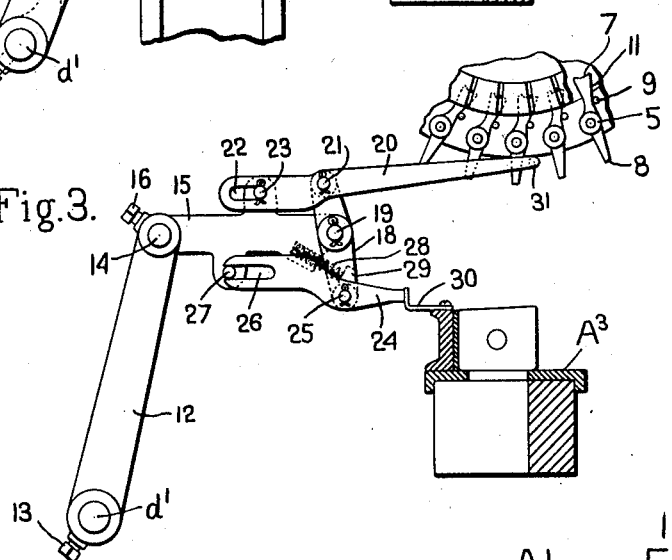
Witnesses.
J. Morrill Fuller
Joseph D. Ashe.
Inventor.
Alonzo E. Rhoades,
by Heard, Smith & Tennant.
Atty's.

UNITED STATES PATENT OFFICE.

ALONZO E. RHOADES, OF HOPEDALE, MASSACHUSETTS, ASSIGNOR TO DRAPER COMPANY, OF HOPEDALE, MASSACHUSETTS, A CORPORATION OF MAINE.

FILLING-END-SLACK-CONTROLLING MECHANISM FOR LOOMS.

1,115,572.   Specification of Letters Patent.   Patented Nov. 3, 1914.

Application filed August 4, 1913. Serial No. 782,775.

*To all whom it may concern:*

Be it known that I, ALONZO E. RHOADES, a citizen of the United States, residing at Hopedale, county of Worcester, State of Massachusetts, have invented an Improvement in Filling-End-Slack-Controlling Mechanism for Looms, of which the following description, in connection with the accompanying drawing, is a specification, like characters on the drawing representing like parts.

In looms provided with automatic filling replenishing mechanism the several filling carriers are mounted ready for use in a suitable hopper or feeder from which they are transferred singly to the lay as required. The filling ends from the several filling carriers of the supply hopper or feeder have to be securely held as the filling carrier is transferred to the lay and picked across the loom. It has been found that the sharp blow of the picker on a shuttle having a fresh supply of filling subjects the filling end to such a shock that it frequently breaks before the filling begins to unwind from the end of the filling carrier. Various means have been devised to overcome this objection by providing an additional length of filling end between the point where the filling end is held and the filling carrier in the hopper. But this additional amount or slack cannot be left loose to be caught in the mechanism or entangled with the other filling ends. It is found that if the slack of each filling end was arranged to be held substantially taut by a spring or yielding device that the strength or power of such device which is necessary to hold the slack filling substantially taut is sufficient to place such a strain on the filling when the filling carrier is transferred from the hopper as frequently to break the filling.

This invention provides a means for positively controlling the slack in the filling ends so as to keep the ends substantially taut and separated and at the same time positively insure the release of the slack when the filling carrier is transferred so that no strain will be placed upon the filling by the retention of the slack to cause the breaking of the filling.

The invention therefore, in its preferred form provides a separate catch or detent for each run of slack filling end and means automatically actuated upon the transfer of a filling carrier to the lay to give a positive relative movement to the catch or detent and its filling to release the slack filling without strain being placed thereon.

The nature of the invention will appear more fully from the accompanying description and drawings and will be particularly pointed out in the claims.

The drawings show so much of an automatic filling replenishing loom of the Northrop type as is necessary to illustrate this invention together with a preferred form of the invention applied thereto.

In the drawings:—Figure 1 is a front elevation partially in cross section of a filling feeder or hopper of this type of loom with a filling end holder and a portion of the lay with the present invention embodied therein. Fig. 2 is an end elevation partially in cross section and partially broken away of the part shown in Fig. 1. Fig. 3 is a detail in end elevation showing certain parts in a different position from that shown in Fig. 2.

A reference to the patent to Mason No. 628,226, granted July 4, 1899 and the patents therein referred to will make clear the general nature of the loom construction which is partially herein shown and in view thereof it will be unnecessary to describe and explain the mechanism other than that directly concerned with this invention.

The filling feeder or hopper comprising the disks or plates $a$, $a'$, the hub or sleeve $a^3$ connecting them to rotate on the stud $a^6$, the transferrer $f'$ to act against the head of a filling carrier $b$ and provided with a finger 210 to act against the tip of the filling carrier, the lay $A^3$ having the usual bunter to actuate the transferrer, the disk-like filling end support $b'$, the stud $b^2$ to which the ends of filling are secured, the spring-controlled dog $m^x$ mounted on the depending end $f^3$ of the transferrer, the actuating rock-shaft $d'$, the controlling connections between this rock-shaft and the dog, these and other parts of the loom mechanism illustrated may be and are substantially as shown and described in the said Patent No. 628,226.

The disk-like filling end support $b'$ is provided peripherally with notches as may be seen in Fig. 2, there being one of these notches for each filling carrier $b$. Filling ends are led from the filling carriers held in the disks $a$, $a'$ over the disk $b'$ each resting in its proper notch and are then wound about the stud $b^2$. To provide the required slack the filling ends are not led directly from the disk $a'$ of the hopper to the disk $b'$ but are deflected as shown at $b^{10}$. The slack thus formed is taken up as the filling carrier is transferred from the hopper with great suddenness and even a light pressure placed upon the slack to hold it substantially taut will be sufficient upon the sudden jerk of the transfer of the filling carrier to cause the breakage of the slack thread with a consequent imperfection in the fabric.

This invention provides for the positive release of the slack portion of the filling end so that no pressure is placed upon the slack to hold it deflected at the time the transfer is made and the slack is taken up. A preferred and practical form of mechanism for securing the results of this invention is illustrated in the drawings and will now be described.

The hub of the filling end support $b'$ is provided with a sleeve 1 on which are mounted concentrically two ring members 2 and 3. The ring member 2 at its periphery is provided with generally radial slots 4 one for each filling end and consequently these slots are spaced equi-distantly. The ring member 3 carries a corresponding plurality of detents 5 pivotally mounted at 6 on the face of the ring 3 near the periphery and with their ends 7 normally projected across the corresponding slots 4 so that if a filling end be in a slot 4 with the detent end 7 in normal position the filling end will be retained thereby in the slot and held deflected as shown in Fig. 1.

The detents 5 are shown as small levers having the tails 8. Each detent is normally held in position across the slot and for this purpose a stop 9 projecting from the ring member 3 adjacent each detent positions it across its slot and a helical spring 10 located in the ring member 3 and surrounding the pivot 6 and attached at one end to the detent and at the other end to the ring member which serves normally to hold the detent up against its slot pin 9. The end 7 of the detent may also be notched or formed with a shoulder which is shown, to form a filling end receiving surface. The side of each detent toward its s. t is inclined as shown at 11. To thread up the hopper each filling end is therefore brought down from the periphery of the disk $a'$ and slid over this inclined edge of the corresponding detent 5 forcing the detent back and causing the filling to slide up in the corresponding slot 4 until it passes the shouldered end of the detent when the detent snaps back against its stop 9 and thus holds the filling in the slot. The filling end is then carried up over the corresponding notch in the disk $b'$ and then wrapped about the stud $b^2$.

The invention provides positively actuated means for tripping each detent 5 as the corresponding filling carrier is transferred to the lay thus positively to release the filling end from the slot 4 and allow the slack to be taken up without any pressure or retarding action upon the filling end. A preferred form of such means is illustrated in detail in Figs. 2 and 3. For this purpose the usual actuating rock-shaft $d'$ is extended beneath the hopper and an upwardly projecting arm 12 is fastened thereto by the set-screw 13. This arm at its upper end carries a short stub-shaft 14 and on this stub-shaft is mounted a second rearwardly projecting arm 15. The arms 12 and 15 are secured to the stub-shaft 14 by set-screws 16 and 17 by means of which the arms may be set at a required angular adjustment to each other and when set the two arms together form a bracket support. At the end of this bracket support toward the lay a lever 18 is fulcrumed at 19 and projects above and below the support. A striker-arm 20 is pivoted at 21 to the upper end of the lever 18 and has one end projecting rearwardly beneath the detent ends and the other end slotted at 22 and riding over a pin 23 projecting from the bracket support. A bunter 24 is pivoted at 25 to the lower end of the lever 18, has its rearward end projecting toward the lay and the opposite end slotted at 26 and riding over a pin 27 also projecting from the bracket support. A helical spring abuts against a projection 29 on the lever 18 and thus acts normally to maintain the striker arm retracted and the bunter projected toward the lay. The lay is provided with a projection 30 to coöperate with the bunter 24. The body of the striker arm is located at one side of the path traveled by the tails 8 of the detents during the rotation of the hopper but has a projecting end 31 which when the striker arm is raised projects into the path of the tails 8. The parts are so proportioned and arranged that when the actuating rock-shaft $d'$ is in its normal position as shown in Fig. 2 the end of the striker arm will be below the path of the tails 8 of the detents and the end of the bunter will be below the path of the projection 30 as the lay beats up. Upon the call for filling replenishment the shaft $d'$ rocks carrying with it the bracket support and raising the position of the striker arm and bunter. The end 31 of the striker arm then passes in the rear of the tail 8 of that detent which holds the filling end running from the filling carrier to be transferred and the bunter 24 comes in the path of the projection 30 on the lay. If now, the transfer of the filling carrier takes place and the bracket support is thus kept in its elevated position, the projection 30 on the lay as it beats up into transfer position strikes the bunter 24, and through the lever 18 projects the striker arm 20 causing its end 31 to strike the tail 8 of the detent thus withdrawing the detent from across its slot 4 and leaving the filling end free so that the slack may be given up as the transfer of the filling carrier takes place.

Having fully described my invention, what I claim as new and desire to secure by Letters Patent is,—

1. An apparatus of the character described comprising a hopper or feeder to contain a plurality of filling carriers; means for holding the several ends of filling; individual means acting normally to engage slack portions of each of the filling ends between its carrier and the point at which it is held; and means automatically actuated upon the transfer of a filling carrier from the hopper to give a relative movement to the corresponding individual means and filling thus to free the run of slack filling.

2. An apparatus of the character described comprising a hopper or feeder to contain a plurality of filling carriers; means for holding the several ends of filling; individual means acting normally to engage slack portions of each of the filling ends between its carrier and the point at which it is held; and means automatically actuated upon the transfer of the filling carrier from the hopper positively to move the corresponding individual means out of engagement with the filling end thus to free the run of slack filling.

3. An apparatus of the character described comprising a hopper or feeder to contain a plurality of filling carriers; means for holding the several ends of filling; a ring slotted radially at its periphery to receive in said slots the runs of filling from each filling carrier; a movable detent mounted adjacent and projecting across each of said slots to hold the run of filling therein deflected and taut; and means automatically actuated upon the transfer of a filling carrier from the hopper to withdraw the corresponding detent from across its slot and thus free the run of filling.

4. An apparatus of the character described comprising a hopper or feeder to contain a plurality of filling carriers; means for holding the several ends of filling; individual means acting normally to engage slack portions of each of the filling ends between its carrier and the point at which it is held; a striker arm, and a bunter connected to said striker arm and movably mounted adjacent the hopper; and means actuated upon the call for filling replenishment to move the striker arm into the path of the corresponding individual means and the bunter into the path of the lay, whereby as the lay beats up the striker arm will act upon proper individual means to release it from engagement with the filling and thus free the run of slack filling.

5. An apparatus of the character described comprising a hopper or feeder to contain a plurality of filling carriers; means for holding the several ends of filling; a movable detent for each run of filling located between the filling carrier and the holding means normally to maintain the filling deflected; a movable bracket support located adjacent the hopper; a striker arm, and a bunter each mounted for longitudinal movement on said support; a lever fulcrumed on said support between and connecting said striker arm and bunter; and means actuated upon the call for filling replenishment to move said bracket support and carry the striker arm opposite the corresponding detent and the bunter into the path of the lay, whereby as the lay beats up the striker arm will move the corresponding detent to free the corresponding run of slack filling.

6. An apparatus of the character described comprising a hopper or feeder to contain a plurality of filling carriers; means for holding the several ends of filling; individual means acting normally to engage slack portions of each of the filling ends between its carrier and the point at which it is held; means for effecting a transfer of a filling-carrier from the hopper; and means controlled by or through said filling-carrier transfer effecting means for giving a relative movement to the filling-end of the carrier to be transferred and the corresponding individual means thus to free the run of slack filling.

7. An apparatus of the character described comprising a hopper or feeder to contain a plurality of filling carriers; means for holding the several ends of filling; individual means acting normally to engage slack portions of each of the filling ends between its carrier and the point at which it is held; means for effecting a transfer of a filling-carrier from the hopper; and means controlled by or through said filling-carrier transfer effecting means for positively moving the proper individual means out of engagement with the filling-end of the carrier to be transferred thus to free the run of slack filling.

In testimony whereof, I have signed my name to this specification, in the presence of two subscribing witnesses.

ALONZO E. RHOADES.

Witnesses:
FRANK H. FRENCH,
DANA OSGOOD.